United States Patent
Glovier (10) Patent No.: US 12,408,572 B2
(45) Date of Patent: Sep. 9, 2025

(54) SYSTEM AND METHOD FOR DETECTING DISK GANG PLUGGING ON A TILLAGE IMPLEMENT

(71) Applicant: CNH Industrial America LLC, New Holland, PA (US)

(72) Inventor: Scott Glovier, Lombard, IL (US)

(73) Assignee: CNH Industrial America LLC, New Holland, PA (US)

( * ) Notice: Subject to any disclaimer, the term of this patent is extended or adjusted under 35 U.S.C. 154(b) by 394 days.

(21) Appl. No.: 17/991,303

(22) Filed: Nov. 21, 2022

(65) Prior Publication Data
US 2024/0164236 A1     May 23, 2024

(51) Int. Cl.
*A01B 33/02*     (2006.01)
*A01B 33/16*     (2006.01)

(52) U.S. Cl.
CPC .......... *A01B 33/024* (2013.01); *A01B 33/16* (2013.01)

(58) Field of Classification Search
CPC ...... A01B 33/024; A01B 33/16; A01B 49/027
See application file for complete search history.

(56) References Cited

U.S. PATENT DOCUMENTS

| | | | |
|---|---|---|---|
| 11,382,266 B2 | 7/2022 | Anderson et al. | |
| 2016/0088787 A1* | 3/2016 | Connell | A01B 63/24 |
| | | | 701/33.9 |
| 2021/0045278 A1 | 2/2021 | Henry | |
| 2021/0120726 A1* | 4/2021 | Barrick | A01B 3/00 |
| 2022/0304213 A1* | 9/2022 | Schroeder | A01B 5/08 |

OTHER PUBLICATIONS

U.S. Appl. No. 17/543,930, filed Dec. 7, 2021.
U.S. Appl. No. 17/837,533, filed Jun. 10, 2022.

* cited by examiner

*Primary Examiner* — Kito R Robinson
*Assistant Examiner* — Roy Rhee
(74) *Attorney, Agent, or Firm* — Dority & Manning, P.A.

(57)     ABSTRACT

A tillage implement includes a frame and a disk gang supported on the frame, with the disk gang having a disk gang shaft and a plurality of disks spaced apart from each other along the disk gang shaft. Furthermore, the tillage implement includes a load sensor configured to generate data indicative of a load being applied to the disk gang and a computing system communicatively coupled to the load sensor. In this respect, the computing system is configured to monitor the load being applied to the disk gang based on the data generated by the load sensor. Additionally, the computing system is configured to determine a number of times that the monitored load crosses a baseline load value during a given time interval. Moreover, the computing system is configured to determine when the disk gang is plugged based on the determined number of times.

20 Claims, 7 Drawing Sheets

SYSTEM AND METHOD FOR DETECTING DISK GANG PLUGGING ON A TILLAGE IMPLEMENT

FIELD OF THE INVENTION

The present disclosure generally relates to tillage implements and, more particularly, to systems and methods for detecting disk gang plugging on a tillage implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In certain configurations, tillage implements include one or more disk gangs supported on its frame. Each disk gang, in turn, includes a plurality of spaced apart disks that are configured to rotate relative to the soil as the tillage implement travels across the field. The rotation of the disks loosens and/or otherwise agitates the soil to prepare the field for subsequent planting operations.

During tillage operations, field materials, such as residue, soil, rocks, and/or the like, may become trapped or otherwise accumulate between adjacent pairs of disks. When such accumulations of field materials become sufficient to prevent a disk gang from providing adequate tillage to the field (e.g., by slowing or preventing rotation of the disks), the disk gang is plugged. In such instances, it is necessary for the operator to take certain corrective actions to remove the accumulated field materials. However, it may be difficult for the tillage implement operator to determine when a disk gang is plugged. In this respect, systems have been developed to detect plugging of disk gangs during tillage operations. While such systems work well, further improvements are needed.

Accordingly, an improved system and method for detecting disk gang plugging on a tillage implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a tillage implement. The tillage implement includes a frame and a disk gang supported on the frame, with the disk gang having a disk gang shaft and a plurality of disks spaced apart from each other along the disk gang shaft. Furthermore, the tillage implement includes a load sensor configured to generate data indicative of a load being applied to the disk gang and a computing system communicatively coupled to the load sensor. In this respect, the computing system is configured to monitor the load being applied to the disk gang based on the data generated by the load sensor. Additionally, the computing system is configured to determine a number of times that the monitored load crosses a baseline load value during a given time interval. Moreover, the computing system is configured to determine when the disk gang is plugged based on the determined number of times.

In another aspect, the present subject matter is directed to a system for detecting disk gang plugging on a tillage implement. The system includes a disk gang having a disk gang shaft and a plurality of disks spaced apart from each other along the disk gang shaft. In addition, the system includes a load sensor configured to generate data indicative of a load being applied to the disk gang and a computing system communicatively coupled to the load sensor. As such, the computing system is configured to monitor the load being applied to the disk gang based on the data generated by the load sensor. Furthermore, the computing system is configured to determine a number of times that the monitored load crosses a baseline load value during a given time interval. Additionally, the computing system is configured to determine when the disk gang is plugged based on the determined number of times.

In a further aspect, the present subject matter is directed to a method for detecting disk gang plugging on a tillage implement. The tillage implement, in turn, includes a disk gang having a disk gang shaft and a plurality of disks spaced apart from each other along the disk gang shaft. The method includes receiving, with a computing system, load sensor data indicative of a load being applied to the disk gang. Moreover, the method includes monitoring, with the computing system, the load being applied to the disk gang based on the received load sensor data. In addition, the method includes determining, with the computing system, a number of times that the monitored load crosses a baseline load value during a given time interval. Furthermore, the method includes determining, with the computing system, when the disk gang is plugged based on the determined number of times.

Additionally, the method includes initiating, with the computing system, a control action associated with de-plugging the disk gang when it is determined that the disk gang is plugged.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for detecting disk gang plugging on a tillage implement. As will be described below, the tillage implement generally includes one or more disk gangs supported on its frame. Each disk gang, in turn, includes a shaft and a plurality of disks spaced apart from each other along the length of the shaft such that a flow zone is defined between each pair of adjacent disks. In this respect, as the tillage implement travels across the field to perform a tillage operation thereon, the disks rotate relative to the soil such that field materials (e.g., soil, residue, rocks, etc.) flow through the flow zones. However, when a sufficient amount of field materials accumulates within one or more flow zones of a disk gang, the operation of the disk gang may be impacted. In such instances, the disk gang is considered plugged.

In several embodiments, a computing system of the disclosed system is configured to detect plugging of the disk gang(s) based on the load(s) acting on the disk gang(s). More specifically, the computing system is configured to receive load sensor data indicative of load(s) being applied to the disk gang(s), such as due to engagement with the soil. Furthermore, the computing system is configured to monitor the load(s) being applied to the disk gang(s) based on the received load sensor data. Additionally, the computing system is configured to determine the number(s) of times that the monitored load(s) crosses a baseline load value during a given time interval. Thereafter, the computing system is configured to determine when the disk gang(s) is plugged based on the corresponding determined number(s) of times. For example, in some embodiments, the computing system may determine that a particular disk gang is plugged when the corresponding number of times exceeds a threshold number of times.

Using the number of times that a load being applied to a disk gang crosses a baseline load value during a given time interval to when the disk gang is plugged improves the operation of the tillage implement. More specifically, as a disk gang starts to plug, the load being applied to that disk gang becomes erratic and quickly increases and decreases. In this respect, as the disk gang starts to plug, the load cycles above and below the baseline load value several times in rapid succession. Thus, by using the number of times that the load being applied to the disk gang crosses the baseline load value during a given time interval, the disclosed system and method provide accurate detections of disk gang plugging.

Figure 1:
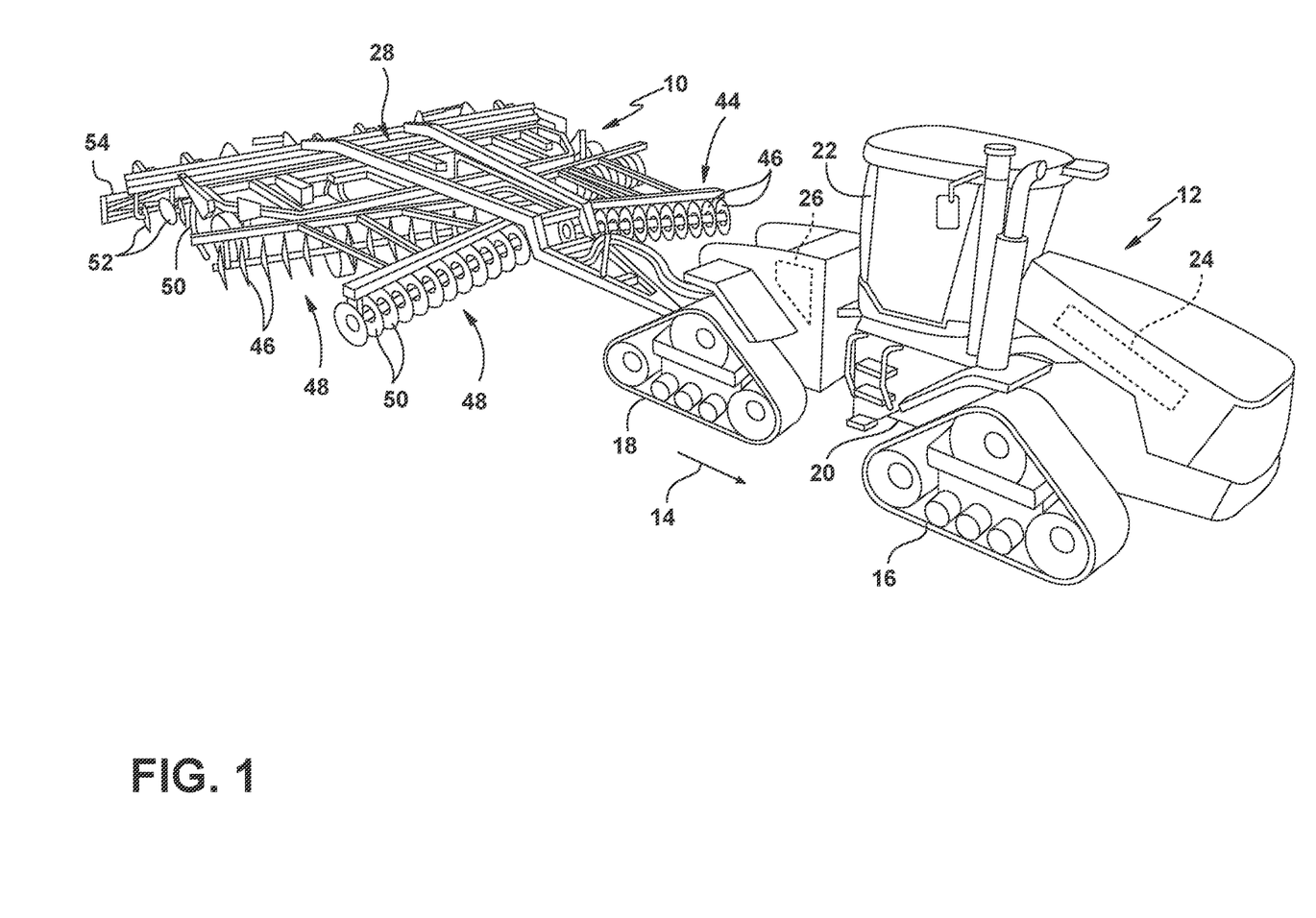
FIG. 1 illustrates a perspective view of one embodiment on a tillage implement coupled to a work vehicle in accordance with aspects of the present subject matter.
Figure 2:
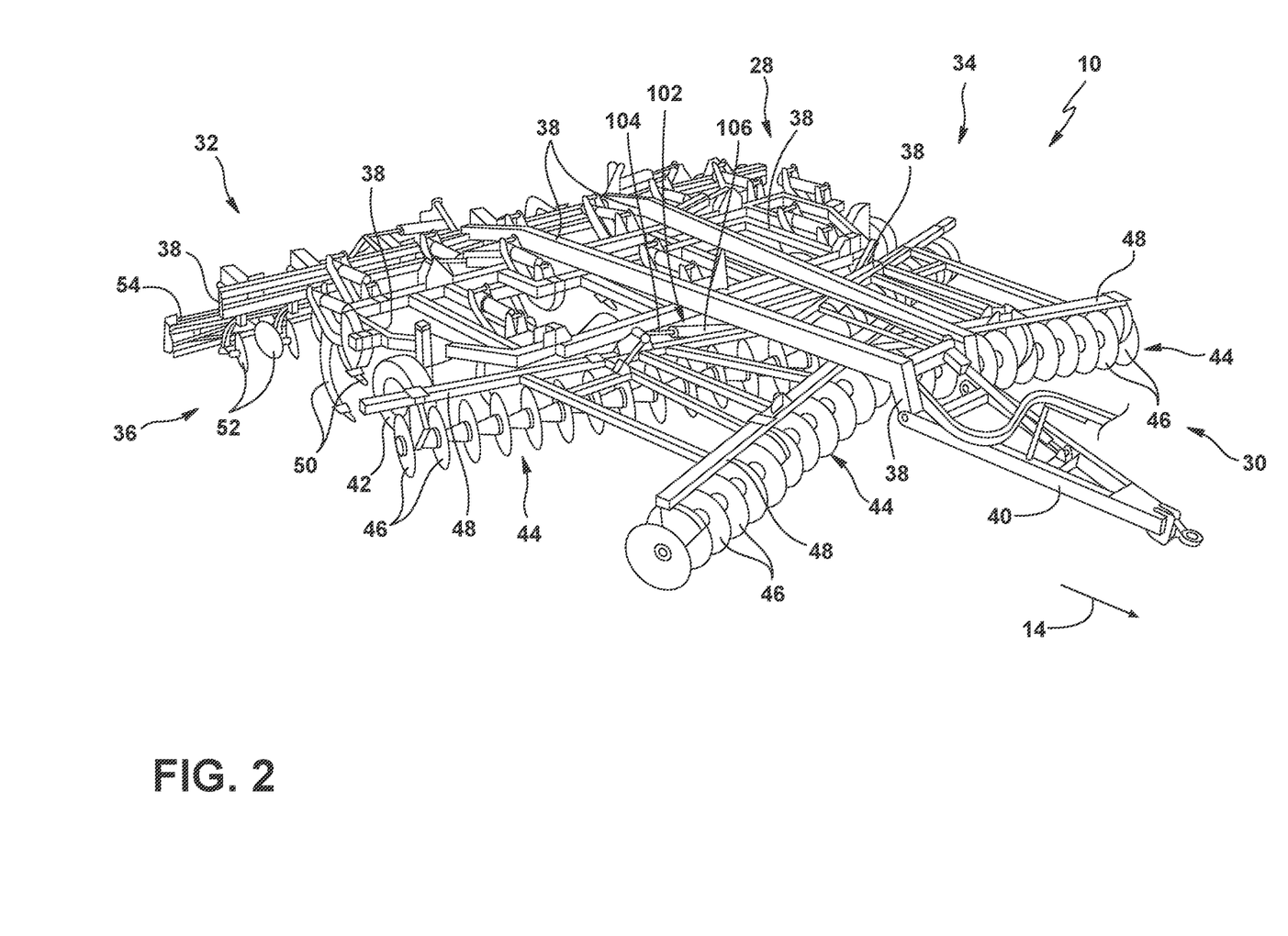
FIG. 2 illustrates an alternative perspective view of the tillage implement shown in FIG. 1, particularly illustrating various components of the tillage implement.

Referring now to the drawings, FIGS. 1 and 2 illustrate differing perspective views of one embodiment of a tillage implement 10 in accordance with aspects of the present subject matter. Specifically, FIG. 1 illustrates a perspective view of the tillage implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 is configured as a disk ripper, and the work vehicle 12 is configured as an agricultural tractor. However, in other embodiments, the implement 10 may be configured as any other suitable type of tillage implement. Similarly, the work vehicle 12 may be configured as any other suitable type of vehicle.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 118 shown in FIG. 4) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disks 46. Each disk 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 102 (one is shown). In general, each actuator 102 is configured to move or otherwise adjust the orientation or position of one of the disk gangs 44 relative to the implement frame 28. For example, as shown in the illustrated embodiment, a first end of each actuator 102 (e.g., a rod 104 of the actuator 102) is be coupled to a support arm 48 of the corresponding disk gang 44, while a second end of each actuator 102 (e.g., the cylinder 106 of the actuator 102) is coupled to the frame 28. The rod 104 of each actuator 102 may be configured to extend and/or retract relative to the corresponding cylinder 106 to adjust the angle of the corresponding disk gang 44 relative to a lateral centerline (not shown) of the frame 28 and/or the penetration depth of the associated disks 46. In the illustrated embodiment, each actuator 102 corresponds to a fluid-driven actuator, such as a hydraulic or pneumatic cylinder. However, each actuator 102 may correspond to any other suitable type of actuator, such as an electric linear actuator.

Additionally, as shown, in one embodiment, the implement frame 28 may be configured to support other ground engaging tools. For instance, in the illustrated embodiment, the frame 28 supports a plurality of shanks 50 configured to rip or otherwise till the soil as the implement 10 is towed across the field. Furthermore, in the illustrated embodiment, the frame 28 also supports a plurality of leveling blades 52 and rolling (or crumbler) basket assemblies 54. However, in other embodiments, any other suitable ground-engaging tools may be coupled to and supported by the implement frame 28, such as a plurality closing discs.

Figure 3:
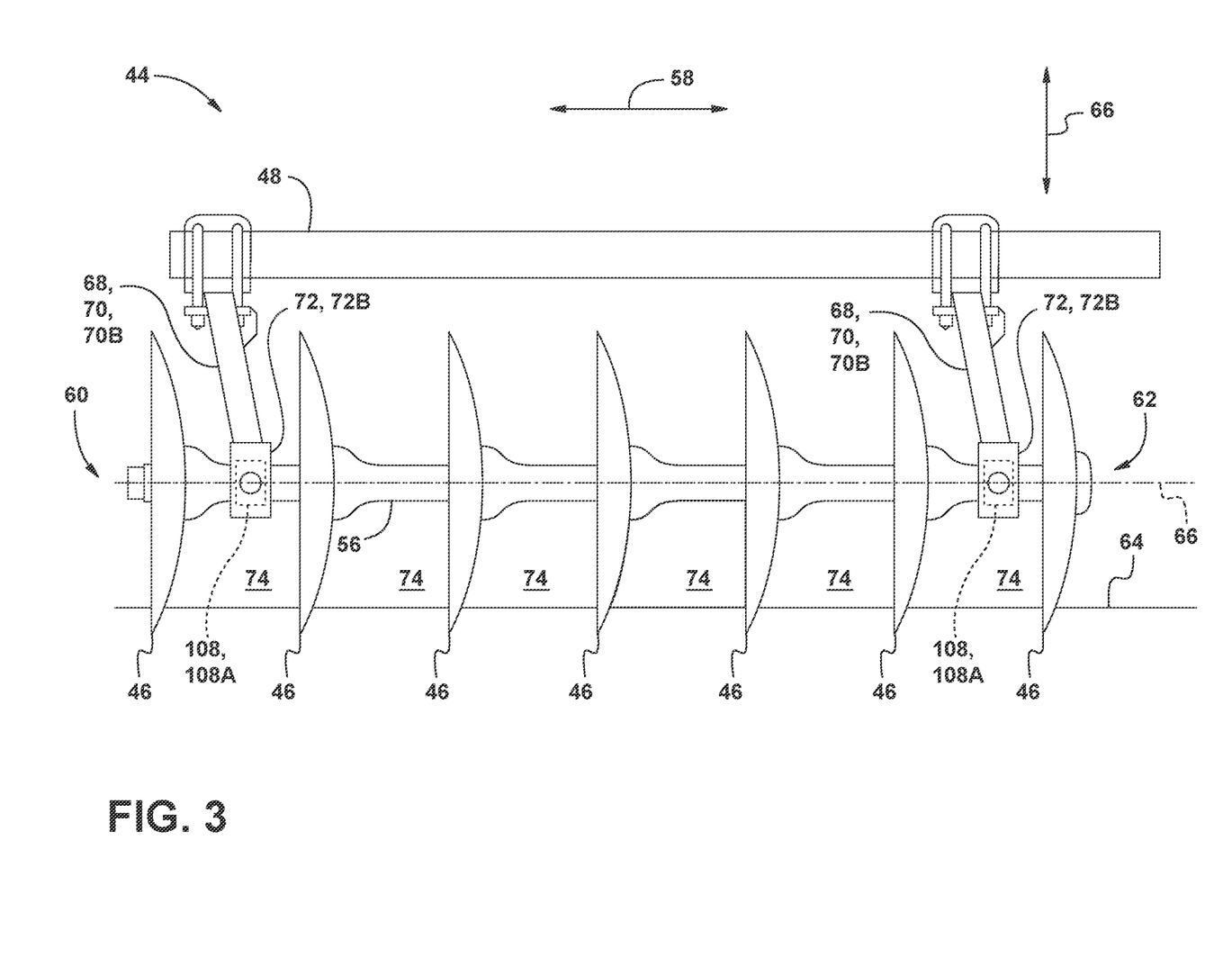
FIG. 3 illustrates a front view of one embodiment of a disk gang on a tillage implement in accordance with aspects of the present subject matter.

Referring now to FIG. 3, a front view of one embodiment of a disk gang 44 of the implement 10 is illustrated in accordance with aspects of the present subject matter. Specifically, in several embodiments, the disk gang 44 may include a disk gang shaft 56 that extends along an axial direction or length of the disk gang 44 (e.g., as indicated by arrow 58 in FIG. 3) between a first end 60 and a second end 62. As shown, the disks 46 are coupled to the disk gang shaft 56 and spaced apart from each other along the axial direction 58. As the implement 10 is moved across a field, the disks 46 may be configured to penetrate the soil surface (e.g., as indicated by line 64 in FIG. 3) of the field and rotate about an axis of rotation (e.g., as indicated by dashed line 66 in FIG. 3) relative to the soil within the field.

In general, the disk gang 44 is supported relative to the corresponding support arm 48 of the tillage implement 10. Specifically, in several embodiments, a pair of hangers 70 (e.g., C-hangers) support the disk gang 44 at a position below the support arm 48. For example, in one embodiment, one end of each hanger 70 may be coupled to the support arm 48, while the opposing end of each hanger 70 is coupled to a bearing block 72. The bearing blocks 72, in turn, are rotatably coupled to the disk gang shaft 56. However, in alternative embodiments, the disk gang 44 may have any other suitable configuration.

As shown in FIG. 3, the disk gang 44 defines a plurality of more flow zones 74 through which field materials may flow during the operation of the implement 10. Specifically, in several embodiments, each flow zone 74 may be defined directly between a pair of adjacent disks 46 in the axial direction 58. In this respect, as the implement 10 travels across the field, field materials (e.g., soil, residue, rocks, and/or the like) may flow through the flow zone 74 as such field materials are being tilled or otherwise processed by the disks 46. During normal, non-plugged operation of the disk gang 44, substantially all of the field materials being processed by the disk gang 44 flow through the flow zones 74, with only minimal field materials like becoming trapped or otherwise accumulating within the flow zones 74. However, when a sufficient amount of field materials accumulates with one or more of the flow zones 74 such that rotation of the disks 46 is impacted (e.g., the rotational speed of the disks 46 is reduced or the disks 46 stop rotating), the disk gang 44 is considered plugged.

The configuration of the tillage implement 10 and the work vehicle 12 described above and shown in FIGS. 1-3 is provided only to place the present subject matter in an exemplary field of use. Thus, the present subject matter may be readily adaptable to any manner of implement and/or vehicle configuration.

Furthermore, one or more load sensors 108 are installed on the tillage implement 10. In general, each load sensor 108 is configured to generate data indicative of the load (or a portion of the load) being applied to one of the disk gangs 44 during a tillage operation. Such loads result from engagement between the disks 46 and the soil into which the disks 46 have penetrated. As will be described below, the data generated by the load sensor(s) 108 is, in turn, be used to detect when one or more of the disk gangs 44 are plugged.

In several embodiments, each disk gang 44 on the implement 10 includes a pair of load sensors 108. For example, in the embodiment illustrated in FIG. 3, the disk gang 44 includes a first load sensor 108A coupled between a first hanger 70A and the disk gang shaft 56 and a second load sensor 108B coupled between a second hanger 70B and the disk gang shaft 56. In one embodiment, the first and second load sensors 108A, 108B may be positioned within first and second bearing blocks 72A, 72B coupled between the disk gang shaft 56 and the first and second hangers 70A, 70B, respectively. However, in alternative embodiments, the tillage implement 10 may include any other suitable number of load sensors 108.

The load sensors 108 may correspond to any suitable sensing devices configured to generate data indicative of the loads acting on the disk gangs 44, such as load cells, strain gauges, and/or the like.

Figure 4:
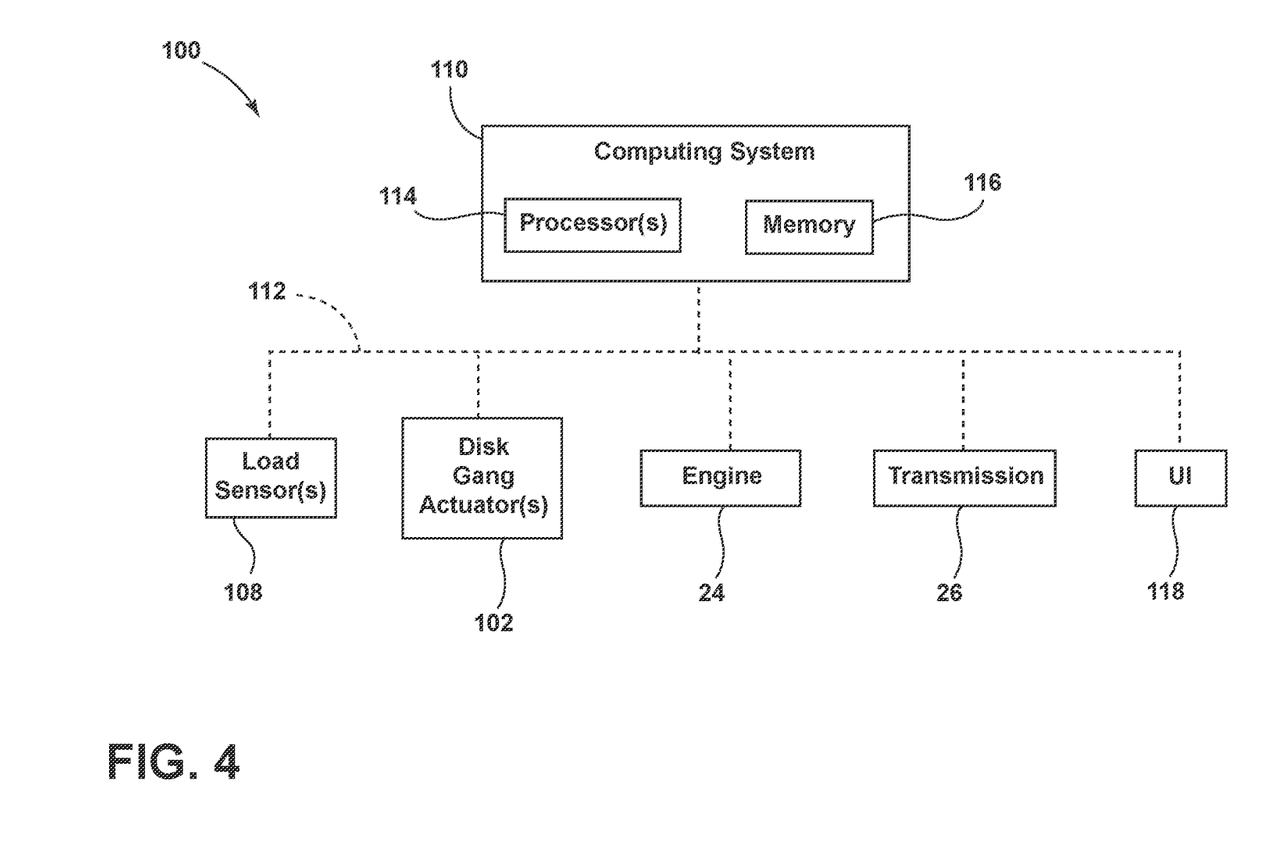
FIG. 4 illustrates a schematic view of one embodiment of a system for detecting disk gang plugging on a tillage implement in accordance with aspects of the present subject matter.

Referring now to FIG. 4, a schematic view of one embodiment of a system 100 for detecting disk gang plugging on a tillage implement is illustrated in accordance with aspects of the present subject matter. In general, the system 100 will be described herein with reference to the tillage implement 10 and the work vehicle 12 described above with reference to FIGS. 1-3. However, the disclosed system 100 may generally be utilized with tillage implements having any other suitable implement configuration and/or with work vehicles having any other suitable vehicle configuration.

As shown in FIG. 4, the system 100 generally includes one or more components of the tillage implement 10 and/or the work vehicle 12. For example, in the illustrated embodiment, the system 100 includes the engine 24 and the transmission 26 of the work vehicle 12 and the disk gang actuators 102 and the load sensor(s) 108 of the tillage implement 10.

Moreover, the system 100 includes a computing system 110 communicatively coupled to one or more components of the tillage implement 10, the work vehicle 12, and/or the system 100 to allow the operation of such components to be electronically or automatically controlled by the computing system 110. For instance, the computing system 110 may be communicatively coupled to the load sensors 108 via a communicative link 112. As such, the computing system 110 may be configured to receive data from the load sensors 108. Furthermore, the computing system 110 may be communicatively coupled to the engine 24, the transmission 26, and/or the disk gang actuators 102 via the communicative link 112. In this respect, the computing system 110 may be configured to control the operation of the components 24, 26, 102. In addition, the computing system 110 may be communicatively coupled to any other suitable components of the implement 10, the vehicle 12, and/or the system 100.

In general, the computing system 110 may comprise one or more processor-based devices, such as a given controller or computing device or any suitable combination of controllers or computing devices. Thus, in several embodiments, the computing system 110 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 116 of the computing system 110 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 116 may generally be configured to store suitable computer-readable instructions that, when implemented by the processor(s) 114, configure the computing system 110 to perform various computer-implemented functions, such as one or more aspects of the methods and algorithms that will be described herein. In addition, the computing system 110 may also include various other suitable components, such as a communications circuit or module, one or more input/output channels, a data/control bus and/or the like.

The various functions of the computing system 110 may be performed by a single processor-based device or may be distributed across any number of processor-based devices, in which instance such devices may be considered to form part of the computing system 110. For instance, the functions of the computing system 110 may be distributed across multiple application-specific controllers or computing devices, such as an implement controller, an engine controller, a transmission controller, and/or the like. Furthermore, the communication link 112 may correspond to a single communicative link (e.g., a CAN bus) or a plurality of communicative links (e.g., CAN bus and ISOBUS).

In addition, the system 100 may also include a user interface 118. More specifically, the user interface 118 may be configured to provide feedback from the computing system 110 (e.g., feedback associated with plugging of the disk gangs 44) to the operator. As such, the user interface 118 may include one or more feedback devices (not shown), such as display screens, speakers, warning lights, and/or the like, which are configured to provide feedback from the computing system 110 to the operator. As such, the user interface 118 may, in turn, be communicatively coupled to the computing system 110 via the communicative link 112 to permit the feedback to be transmitted from the computing system 110 to the user interface 118. Furthermore, some embodiments of the user interface 118 may include one or more input devices, such as touchscreens, keypads, touchpads, knobs, buttons, sliders, switches, mice, microphones, and/or the like, which are configured to receive inputs from the operator. In one embodiment, the user interface 118 may be mounted or otherwise positioned within the cab 22 of the work vehicle 12. However, in alternative embodiments, the user interface 118 may mounted at any other suitable location.

Figure 5:
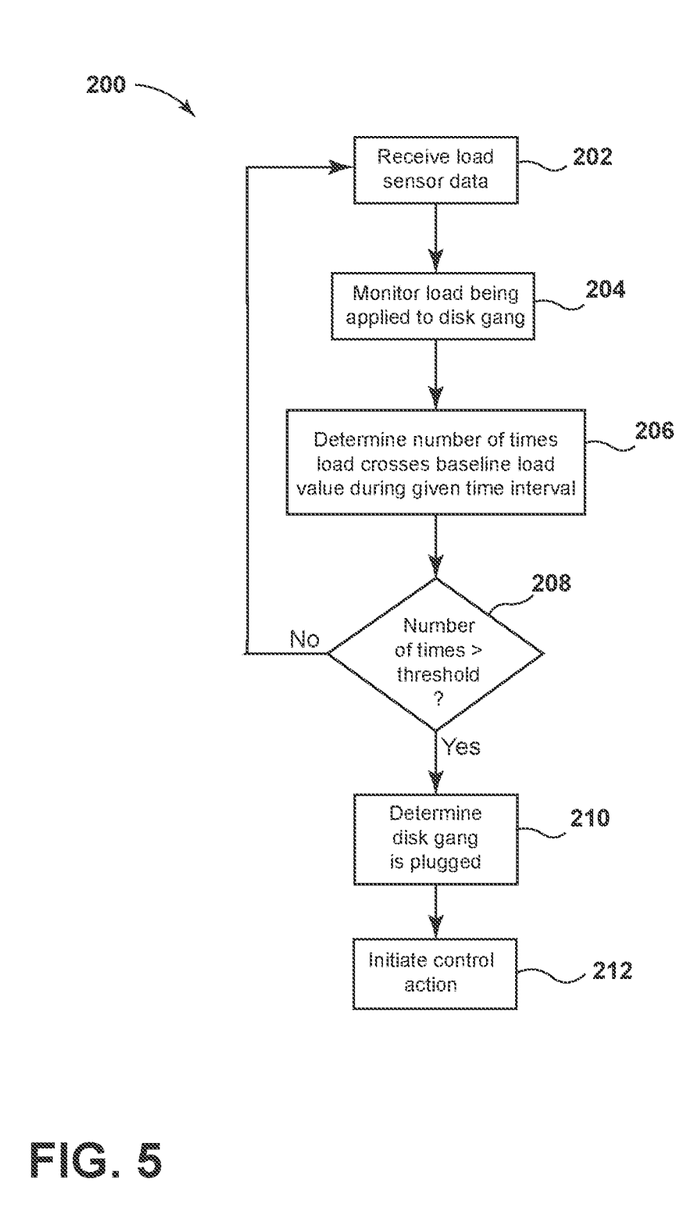
FIG. 5 illustrates a flow diagram providing one embodiment of control logic for detecting disk gang plugging on a tillage implement in accordance with aspects of the present subject matter.

Referring now to FIG. 5, a flow diagram of one embodiment of control logic 200 that may be executed by the computing system 110 (or any other suitable computing system) for detecting disk gang plugging on a tillage implement is illustrated in accordance with aspects of the present subject matter. Specifically, the control logic 200 shown in FIG. 5 is representative of steps of one embodiment of an algorithm that can be executed to detect disk gang plugging on a tillage implement without requiring substantial computing resources and/or processing time. However, in other embodiments, the control logic 200 may be used in association with any other suitable system, application, and/or the like for detecting disk gang plugging on a tillage implement.

As shown in FIG. 5, at (202), the control logic 200 includes receiving load sensor data indicative of the load acting on a disk gang of a tillage implement. Specifically, as mentioned above, in several embodiments, the computing system 110 may be communicatively coupled to the load sensor(s) 108 via the communicative link 112. In this respect, as the implement/vehicle 10/12 travel across the field to perform a tillage operation thereon, the computing system 110 may receive data from the load sensor(s) 108. Such data may, in turn, be indicative of the load(s) being applied to the disk gang(s) 44, such as due to the engagement between the disk gang(s) 44 and the soil in the field.

Furthermore, at (204), the control logic 200 includes monitoring the load being applied to the disk gang based on the received load sensor data. Specifically, in several embodiments, the computing system 110 may be configured to monitor the load(s) being applied to the disk gang(s) 44 based on the load sensor data received at (202). For instance, the computing system 110 may include a look-up table, suitable mathematical formula, and/or algorithms stored within its memory device(s) 116 that correlates the received load sensor data to the load(s) being applied to the disk gang(s) 44.

Additionally, at (206), the control logic 200 includes determining the number of times that the monitored load crosses a baseline load value during a given time interval. Specifically, in several embodiments, the computing system 110 may be configured to determine the number(s) of times that the load(s) monitored at (204) crosses a baseline load value during a given time interval. For example, in one embodiment, the computing system 110 may determine each time the monitored load(s) rises above the baseline load value and each time the monitored load(s) falls below the baseline load value. Thus, the computing system 110 determines each time the monitored load(s) cycles above and below the baseline load value.

As will be described below, the number(s) of times that the monitored load(s) crosses the baseline value during the given interval is used to determine when the disk gang(s) 44 is plugged. Moreover, in several embodiments, the maximum magnitudes of the monitored load(s) each time the monitored load(s) crosses the baseline load value and/or the time durations across which the monitored load(s) remains above the baseline load value each time monitored load(s) crosses the baseline load value may be used in addition to the number(s) of times determined at (206) to determine when the disk gang(s) 44 is plugged.

The given time period used by the computing system 110 may generally be selected to prevent sporadic contact with isolated field conditions (e.g., rocks or other impediments) from triggering a plugging determination. For instance, in one embodiment, the given time period may be three seconds or less, such as two seconds, one second, or half of a second.

Moreover, at (208), the control logic 200 includes determining when the determined number of times exceeds a threshold number of times. More specifically, as the disk gang(s) 44 starts to plug, the load(s) being applied to the disk gang(s) 44 becomes erratic and quickly increases and decreases such that the load(s) cycles above and below the baseline load value several times in rapid succession. In this respect, the computing system 110 is configured to determine when the number(s) of times that the load(s) crosses the baseline load value during the given time interval exceeds a threshold number of times. When the determined number(s) of times corresponding to one or more of the disk gangs 44 is equal to or less than the threshold number of times, such disk gang(s) 44 is determined to not be plugged. In such instances, the control logic 200 (with respect to the non-plugged disk gang(s)) returns to (202). Conversely, when the determined number(s) of times corresponding to one or more of the disk gangs 44 is greater than the threshold number of times, the computing system 110 is configured to determine at (210) such disk gang(s) 44 is plugged.

Figure 6:
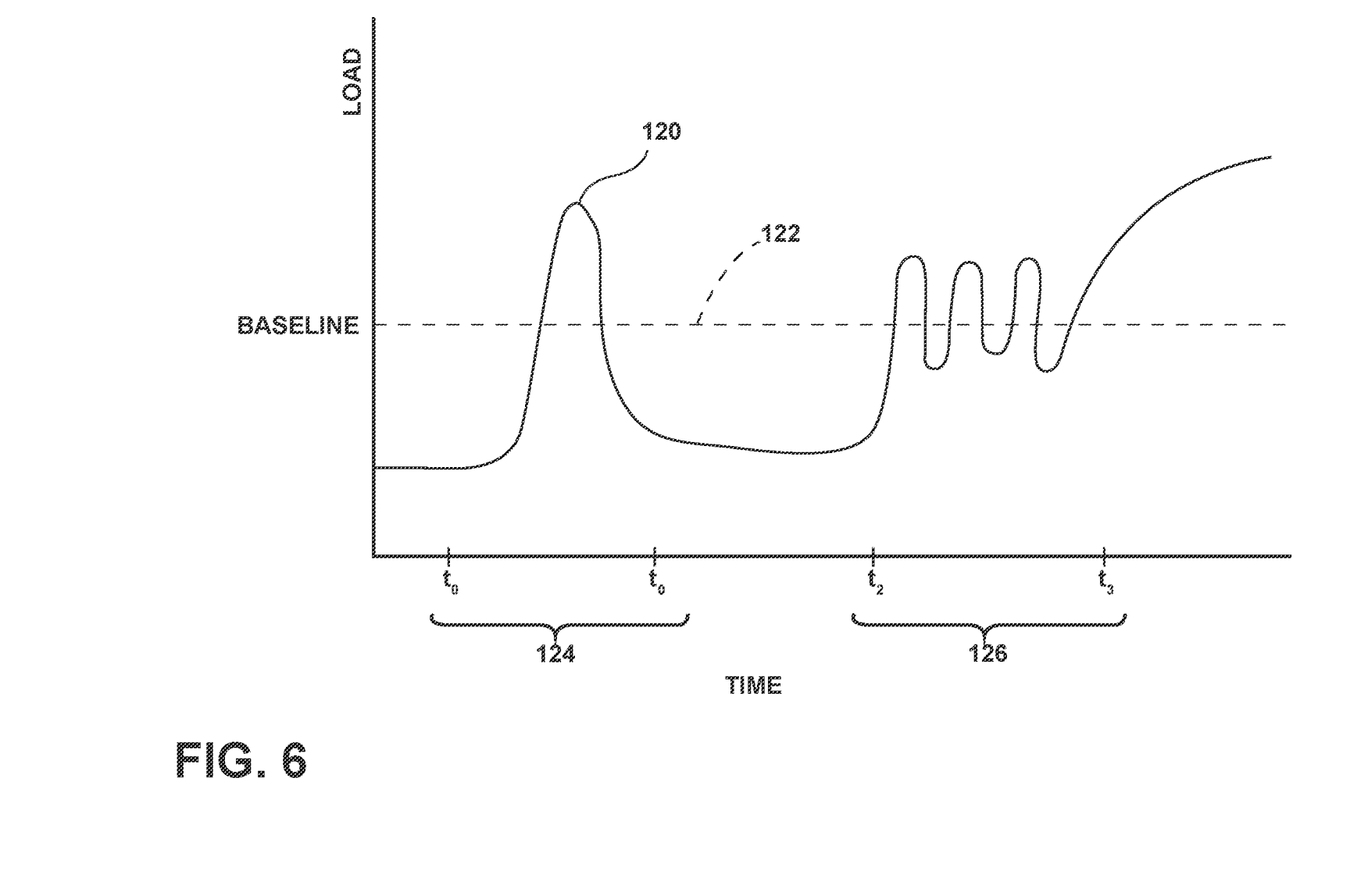
FIG. 6 illustrates a graphical view of an example dataset charting the load being applied to a disk gang of a tillage implement over time in accordance with aspects of the present subject matter.

FIG. 6 illustrates a graphical view of an example dataset charting the load being applied to one of the disk gangs 44 of the tillage implement 10 (e.g., as indicated by solid line 120 in FIG. 6) relative to a baseline load value (e.g., as indicated by dashed line 122 in FIG. 6) over time as monitored by the computing system 110. As shown in FIG. 6, during various different time periods, the load 120 being applied to the disk gang 44 crosses the baseline load value 122, such as during a first time period 124 between time to and time $t_1$ and during a second time period 126 between time t2 and time t3. In such instances, the computing system 110 may be configured to identify when the load 120 crosses the baseline load value 122. As indicated above, when the number of times that the load 120 crosses the baseline load value 122 during a given time period exceeds the threshold number of times, the computing system 110 is configured to determine that the disk gang 44 is plugged. For instance, in the example dataset of FIG. 6, it may be assumed that the number of times that the load 120 crosses the baseline load value 122 during the first time period 124 is less than the threshold number of times. In such instances, the disk gang 44 may have encountered an isolated field condition not associated with any plugging of gang 44. Conversely, it may be assumed that the number of times that the load 120 crosses the baseline load value 120 during the second time period 126 is greater than the threshold number of times. In such instances, the rapid variation in the load data may indicate that the disk gang 44 is becoming plugged with soil and/or residue.

The threshold number of times used by the computing system 110 may generally be selected to prevent contact with isolated field conditions (e.g., rocks or other impediments) from triggering plugging determinations. For instance, in one embodiment, the threshold number may be three or more times, such as four times, five times, or six times.

In some embodiments, the threshold number of times may be dynamically set. Specifically, in one embodiment, the maximum magnitudes of the monitored load(s) each time the monitored load(s) crosses the baseline load value may be used to set the threshold number of times. For example, in such an embodiment, the threshold number of times may be decreased when the maximum magnitudes increase and the increased when the maximum magnitudes decrease. In another embodiment, the time durations across which the monitored load(s) remains above the baseline load value each time monitored load(s) crosses the baseline load value may be used to set the threshold number of times. For example, in such an embodiment, the threshold number of times may be decreased when the time durations increase and the increased when the time durations decrease.

Referring again to FIG. 5, at (212), the control logic 200 includes initiating a control action associated with de-plugging the disk gang. Specifically, in several embodiments, when it is determined at (210) that one or more of the disk gangs 44 are plugged, the computing system 110 is configured to initiate one or more control actions associated with de-plugging such disk gang(s) 44. For example, in one embodiment, the control action(s) include providing a notification to the operator of the implement/vehicle 10/12 that one or more of the disk gangs 44 are plugged. In such an embodiment, the computing system 110 may transmit suitable control signals to the user interface 118 instructing the user interface 118 to provide the appropriate notification to the operator.

Alternatively, or additionally, the control action(s) include adjusting an operating parameter(s) of the implement 10 and/or the vehicle 12. For example, in one embodiment, the control action(s) may include adjusting (e.g., reducing) the ground speed of the implement/vehicle 10/12. In such an embodiment, the computing system 110 may transmit suitable control signals to the engine 24 and/or transmission 26 of the vehicle 12 instructing the engine 24 and/or transmission 26 to adjust (e.g., reduce) the ground speed of the implement/vehicle 10/12. In a further embodiment, the control action(s) include adjusting the position of the plugged disk gang(s) 44 relative to the implement frame 28. In such an embodiment, the computing system 110 may transmit suitable control signals to the corresponding disk gang actuator(s) 102 of the implement 10 instructing the disk gang actuator(s) 102 to adjust position of the plugged disk gang(s) 44 relative to the implement frame 28 (e.g., to adjust the force(s) being applied to and/or the penetration depth(s) of the plugged disk gang(s) 44). However, in alternative embodiments, any other suitable control actions may be initiated at (212). Thereafter, the control logic 200 returns to (202).

Additionally, in several embodiments, one or more of the settings or parameters associated with the control logic 200 may be tunable or otherwise adjustable by the operator of the implement/vehicle 10/12. Thus, the operator may be able to tune certain parameters to provide the desired sensitivity of disk gang plugging detection. For example, in some embodiments, the baseline load threshold may be tunable by the operator. In one embodiment, the operator may select a baseline load value, which is then squared to amplify its effect. In such an embodiment, the operator can tune the baseline load value based on the conditions of the field (e.g., soil type, moisture content, etc.) to prevent disk gang plugging being detected excessively or too infrequently. However, in alternative embodiments, any other suitable parameters or settings may be operator tunable.

Figure 7:
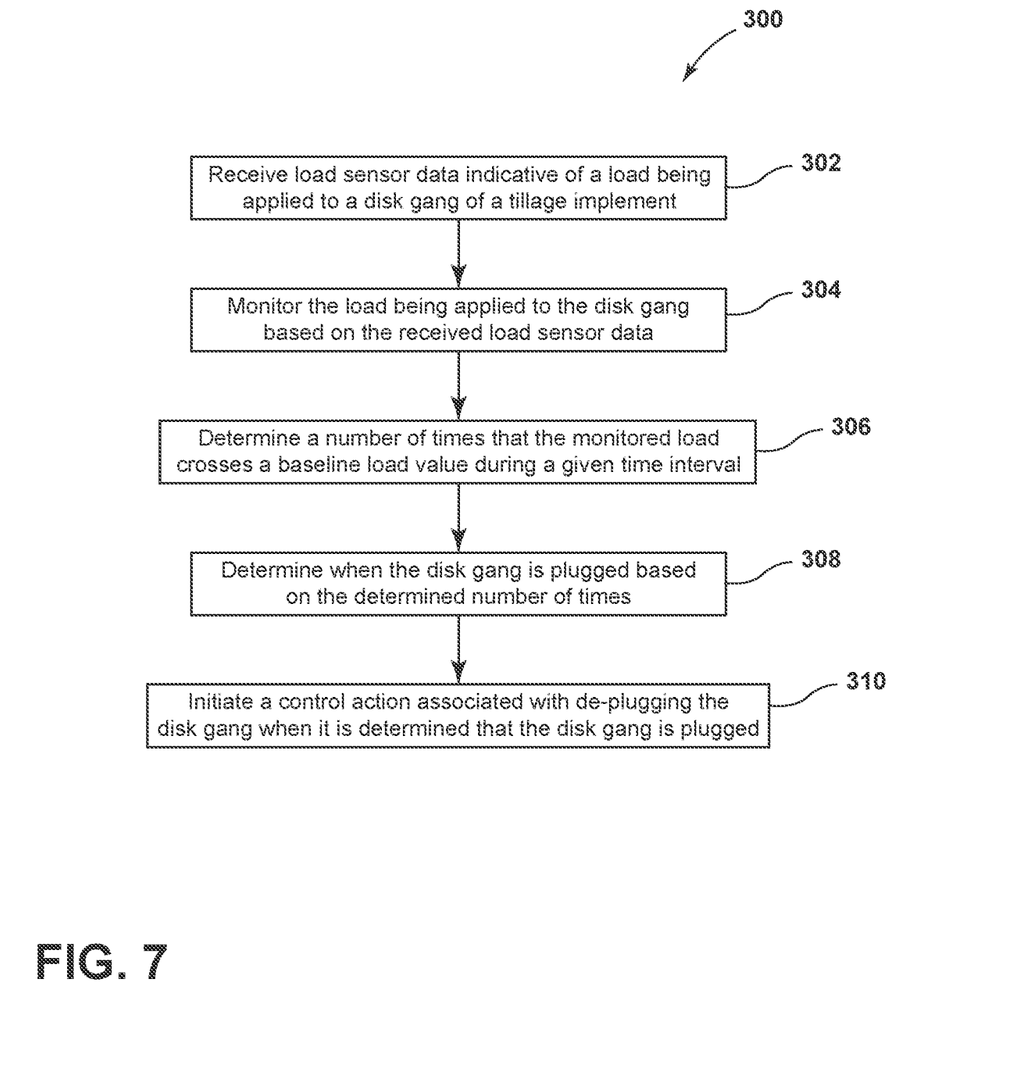
FIG. 7 illustrates a flow diagram of one embodiment of a method for detecting disk gang plugging on a tillage implement in accordance with aspects of the present subject matter.

Referring now to FIG. 7, a flow diagram of one embodiment of a method 300 for detecting disk gang plugging on a tillage implement is illustrated in accordance with aspects of the present subject matter. In general, the method 300 will be described herein with reference to the tillage implement 10 and the system 100 described above with reference to FIGS. 1-6. However, it should be appreciated by those of ordinary skill in the art that the disclosed method 300 may generally be implemented with any tillage implements having any suitable implement configuration, work vehicles having any suitable vehicle configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 includes receiving, with a computing system, load sensor data indicative of a load being applied to a disk gang of a tillage implement. For instance, as described above, the computing system 110 may be configured to receive load sensor data from the load sensor(s) 108. The received load sensor data is, in turn, indicative of load(s) acting on the disk gang(s) 44 of the tillage implement 10.

Furthermore, at (304), the method 300 includes monitoring, with the computing system, the load being applied to the disk gang based on the received load sensor data. For instance, as described above, the computing system 110 may be configured to monitor the load(s) being applied to the disk gang(s) 44 based on the received load sensor data.

Additionally, at (306), the method 300 includes determining, with the computing system, a number of times that the monitored load crosses a baseline load value during a given time interval. For instance, as described above, the computing system 110 may be configured to determine the number(s) of times that the monitored load(s) acting on the disk gang(s) 44 crosses a baseline load value during a given time interval.

Moreover, at (308), the method 300 includes determining, with the computing system, when the disk gang is plugged based on the determined number of times. For instance, as described above, the computing system 110 may be configured to determine when the disk gang(s) 44 is plugged based on the determined number(s) of times.

In addition, at (310), the method 300 includes initiating, with the computing system, a control action associated with de-plugging the disk gang when it is determined that the disk gang is plugged. For instance, as described above, the computing system 110 may be configured to initiate one or more control actions associated with de-plugging the disk gang(s) 44 when it is determined that the disk gang(s) 44 is plugged. Such control action(s) may include providing a notification to the operator of the implement/vehicle 10/12, adjusting the ground speed of the implement/vehicle 10/12, adjusting the position of the disk gang(s) 44 relative to the implement frame 28, and/or the like.

It is to be understood that the steps of the control logic 200 and the method 300 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the control logic 200 and the method 300, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A tillage implement, comprising:
 a frame;
 a disk gang supported on the frame, the disk gang including a disk gang shaft and a plurality of disks spaced apart from each other along the disk gang shaft;
 a load sensor configured to generate data indicative of a load being applied to the disk gang; and
 a computing system communicatively coupled to the load sensor, the computing system configured to:
  monitor the load being applied to the disk gang based on the data generated by the load sensor;
  determine a number of times that the monitored load crosses a baseline load value during a given time interval; and
  determine when the disk gang is plugged based on the determined number of times.

2. The tillage implement of claim 1, wherein, when determining when the disk gang is plugged, the computing system is configured to determine when the disk gang is plugged based on a maximum magnitude of the monitored load each time the monitored load crosses the baseline load value and the determined number of times.

3. The tillage implement of claim 1, wherein, when determining when the disk gang is plugged, the computing system is configured to determine when the disk gang is plugged based on a time duration across which the monitored load remains above the baseline load value each time the monitored load crosses the baseline load value and the determined number of times.

4. The tillage implement of claim 1, wherein, when determining when the disk gang is plugged, the computing system is configured to determine that the disk gang is plugged when the determined number of times exceeds a threshold number of times.

5. The tillage implement of claim 1, wherein the computing system is further configured to:
    initiate a control action associated with de-plugging the disk gang when it is determined that the disk gang is plugged.

6. A system for detecting disk gang plugging on a tillage implement, the system comprising:
    a disk gang including a disk gang shaft and a plurality of disks spaced apart from each other along the disk gang shaft;
    a load sensor configured to generate data indicative of a load being applied to the disk gang; and
    a computing system communicatively coupled to the load sensor, the computing system configured to:
        monitor the load being applied to the disk gang based on the data generated by the load sensor;
        determine a number of times that the monitored load crosses a baseline load value during a given time interval; and
        determine when the disk gang is plugged based on the determined number of times.

7. The system of claim 6, wherein, when determining when the disk gang is plugged, the computing system is configured to determine when the disk gang is plugged based on a maximum magnitude of the monitored load each time the monitored load crosses the baseline load value and the determined number of times.

8. The system of claim 6, wherein, when determining when the disk gang is plugged, the computing system is configured to determine when the disk gang is plugged based on a time duration across which the monitored load remains above the baseline load value each time the monitored load crosses the baseline load value and the determined number of times.

9. The system of claim 6, wherein, when determining when the disk gang is plugged, the computing system is configured to determine that the disk gang is plugged when the determined number of times exceeds a threshold number of times.

10. The system of claim 9, wherein the threshold number of times is at least three times.

11. The system of claim 6, wherein the given time interval is less than three seconds.

12. The system of claim 6, wherein the computing system is further configured to:
    initiate a control action associated with de-plugging the disk gang when it is determined that the disk gang is plugged.

13. The system of claim 12, wherein the control action comprises notifying an operator of the tillage implement that the disk gang is plugged.

14. The system of claim 12, wherein the control action comprises adjusting an operating parameter of the tillage implement.

15. The system of claim 14, wherein the operating parameter comprises at least one of a ground speed of the tillage implement or a position of the disk gang relative to a frame of the tillage implement.

16. A method for detecting disk gang plugging on a tillage implement, the tillage implement including a disk gang having a disk gang shaft and a plurality of disks spaced apart from each other along the disk gang shaft, the method comprising:
    receiving, with a computing system, load sensor data indicative of a load being applied to the disk gang;
    monitoring, with the computing system, the load being applied to the disk gang based on the received load sensor data;
    determining, with the computing system, a number of times that the monitored load crosses a baseline load value during a given time interval;
    determining, with the computing system, when the disk gang is plugged based on the determined number of times; and
    initiating, with the computing system, a control action associated with de-plugging the disk gang when it is determined that the disk gang is plugged.

17. The method of claim 16, wherein determining when the disk gang is plugged comprises determining, with the computing system, when the disk gang is plugged based on a maximum magnitude of the monitored load each time the monitored load crosses the baseline load value and the determined number of times.

18. The method of claim 16, wherein determining when the disk gang is plugged comprises determining, with the computing system, when the disk gang is plugged based on a time duration across which the monitored load remains above the baseline load value each time the monitored load crosses the baseline load value and the determined number of times.

19. The method of claim 16, wherein determining when the disk gang is plugged comprises determining, with the computing system, that the disk gang is plugged when the determined number of times exceeds a threshold number of times.

20. The method of claim 19, wherein the threshold number of times is at least three times.

* * * * *